(12) United States Patent
Draznin

(10) Patent No.: US 12,405,831 B2
(45) Date of Patent: Sep. 2, 2025

(54) MAPPING AN APPLICATION SIGNATURE TO DESIGNATED CLOUD RESOURCES

(71) Applicant: MICROSOFT TECHNOLOGY LICENSING, LLC, Redmond, WA (US)

(72) Inventor: Sagiv Draznin, Walnut Creek, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 509 days.

(21) Appl. No.: 17/531,095

(22) Filed: Nov. 19, 2021

(65) Prior Publication Data

US 2023/0161634 A1    May 25, 2023

(51) Int. Cl.
| | |
|---|---|
| *G06F 9/50* | (2006.01) |
| *G06F 9/54* | (2006.01) |
| *H04L 41/5019* | (2022.01) |
| *H04L 67/10* | (2022.01) |

(52) U.S. Cl.
CPC ........... *G06F 9/5055* (2013.01); *G06F 9/547* (2013.01); *H04L 41/5019* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,166,890 B2 | 10/2015 | Maytal et al. | |
| 2012/0330711 A1* | 12/2012 | Jain | G06F 9/5072 709/224 |

(Continued)

FOREIGN PATENT DOCUMENTS

| | | | | |
|---|---|---|---|---|
| WO | WO-2018167093 A1 * | 9/2018 | ......... | G06F 9/45533 |
| WO | WO-2019135704 A1 * | 7/2019 | ........... | G06F 9/5027 |

OTHER PUBLICATIONS

Costoche et al. "Resource Management in cloud platform as a service systems: Analysis and opportunites" Oct. 2017 vol. 132 pp. 98-118.*

(Continued)

*Primary Examiner* — Charles E Anya
(74) *Attorney, Agent, or Firm* — Newport IP, LLC; Jacob P. Rohwer

(57) ABSTRACT

The techniques described herein provide systems for optimizing the use of cloud infrastructure and for assigning the execution of an application to hardware resources in a cloud platform that are preconfigured to handle the execution of the application. An application registration entity is made aware of different tiers within the cloud infrastructure. A tier is a designated area within a datacenter, for example, where hardware resources are preconfigured to tailor to the execution of a particular classification of applications. The application registration entity can classify an application into one of various classifications based on performance parameters which are represented by an application signature. Once classified, the application registration entity assigns, or maps, the execution of the application to a tier in a datacenter that corresponds to the classification. This tier includes hardware resources preconfigured, or previously configured, to satisfy the performance parameter.

17 Claims, 8 Drawing Sheets

(56) References Cited

U.S. PATENT DOCUMENTS

| | | | | |
|---|---|---|---|---|
| 2013/0185433 A1* | 7/2013 | Zhu | .................... | H04L 43/0876 |
| | | | | 709/226 |
| 2013/0185729 A1* | 7/2013 | Vasic | .................... | G06F 9/5072 |
| | | | | 718/104 |
| 2014/0086177 A1* | 3/2014 | Adjakple | .............. | H04W 74/04 |
| | | | | 370/329 |
| 2014/0172954 A1* | 6/2014 | Salsburg | ................. | H04L 67/10 |
| | | | | 709/203 |
| 2015/0302440 A1 | 10/2015 | Monden et al. | | |
| 2022/0156661 A1* | 5/2022 | Xu | ....................... | H04L 41/0826 |
| 2022/0224753 A1* | 7/2022 | Bartram | .............. | G06F 11/3006 |

OTHER PUBLICATIONS

"International Search Report and Written Opinion Issued in PCT Application No. PCT/US22/042411", Mailed Date: Nov. 29, 2022, 12 Pages.

* cited by examiner

MAPPING AN APPLICATION SIGNATURE TO DESIGNATED CLOUD RESOURCES

BACKGROUND

As cloud computing gains popularity, more and more data and/or services are stored and/or provided online via network connections. Providing an optimal and reliable user experience is an important aspect for cloud platforms (e.g., AMAZON WEB SERVICES, MICROSOFT AZURE, GOOGLE CLOUD, etc.) that offer network services. In many scenarios, a cloud platform may provide a service to thousands or millions of tenants (e.g., customers, clients, etc.). In order to provide this service, a cloud platform often includes geographically dispersed datacenters. Within an individual datacenter, the cloud platform configures and manages cloud infrastructure which includes various resources that can be allocated for execution of services, or applications, which belong to tenants of the cloud platform. These resources can include hardware resources such as physical machines (e.g., servers configured in various racks) for compute and storage purposes, physical networking equipment (e.g., network switches, network routers, etc.) for data communication purposes, and so forth. These resources also include virtual resources such as virtual machines, virtual networks, etc.

Typically, a cloud provider fully isolates, or disaggregates, the hardware resources configured in the cloud from an application layer that runs on top of the hardware resources. More specifically, the hardware resources allocated to execute an application for a tenant of the cloud platform are generally agnostic to the needs of the application, or at the least, are not tailored to the needs of the application. Rather, the cloud provider assigns the application to randomly selected hardware resources which are uniformly configured across a datacenter of the cloud platform. The random selection is implemented because cloud platforms are conventionally built to maximize the flexible allocation of hardware resources, such that an application can be executed on any of the uniformly configured hardware resources within the datacenter. To this end, there are no defined datacenter boundaries that separate hardware resources configured in a first manner from hardware resources configured in a second manner.

As data privacy and security constraints continue to evolve, the quality of service established for different applications executed by the many tenants of a cloud platform may demand different performance requirements. For instance, a financial transaction application for a banking tenant may demand that supporting hardware resources maintain state to ensure that data for a current transaction is not lost in the event of an unexpected interruption. In contrast, a sports news application for a content provider tenant may not demand that supporting hardware resources maintain state in the event of an unexpected interruption because it is easy for a user to return to the sports article that was being read. Unfortunately, due to the aforementioned manner in which cloud platforms are conventionally built to maximize the flexible allocation of hardware resources, a cloud platform can realize unnecessary resource expenditure trying to understand and/or meet the needs of an application. This can lead to higher operational costs, as well as tenant dissatisfaction with respect to performance.

It is with respect to these and other considerations that the disclosure made herein is presented.

SUMMARY

The disclosed techniques provide intelligent cloud awareness by implementing an application registration entity to effectively assign an application to hardware resources in a cloud platform. The application registration entity is made aware of different tiers within the cloud infrastructure. A tier is a designated area within a datacenter, for example, where hardware resources are preconfigured to tailor to the execution of a particular classification of applications.

The application registration entity can classify an application into one of various classifications based on performance parameters. For example, an application described herein can be configured to generate a signature that represents at least one performance parameter associated with execution of the application within a cloud platform. The application registration entity is configured to analyze the signature in order to classify the application into one of a number of different classifications (e.g., two classifications, three classifications, five classifications, ten classifications, etc.), which have been established by the cloud provider to manage resource allocation and reduce costs based on predicted tenant demand for execution of applications and services. Once classified, the application registration entity assigns, or maps, execution of the application to a tier in a datacenter that corresponds to the classification. This tier includes hardware resources preconfigured, or previously configured, to satisfy the performance parameter.

As discussed above, existing solutions for cloud platform management attempt to maximize flexibility with respect to hardware resource allocation and application assignment. Stated alternatively, a cloud provider focuses on the benefit of being able to assign execution of the application to any arbitrary area (e.g., any server in any rack) in a selected datacenter of the cloud platform. While the existing solutions provide some benefits, the approach can lead to unnecessary resource expenditure and higher operational costs. Moreover, the existing solutions often fail at meeting the needs of all the different types of applications that demand different performance. In contrast to the existing solutions, the techniques disclosed herein allow for more efficient management and usage of hardware resources that provide a more tailored environment for different classifications of applications.

As described herein, the different classifications of applications may be defined based on application priority. For instance, a first group of applications may be high priority applications, a second group of applications may be medium priority applications, and a third group of applications may be low priority applications. The priority of an application may be established based on a type of service, a type of data being stored or provided, an amount of time it takes to complete a task, user experience expectations, or other application execution aspects. Accordingly, applications that perform a more important service using data that is generally known to be private or sensitive (e.g., a user's financial data, a user's health data, etc.) are likely to have a higher priority than applications that perform a less important service using data that is generally known to not be private or sensitive (e.g., content for consumption by the general population, weather data, map data, etc.). The differences in priority can be illustrated using the previous example of a financial transaction application compared to a sports news application.

In some examples, the priority of an application can be defined via elements of a service level agreement (SLA) between a tenant and an operator of the cloud platform. That is, SLAs can outline performance expectations that can be mapped to the importance of the service provided by the application. In this way, more important applications are likely to execute flawlessly in the cloud with little or no interruptions compared to the less important applications. Ultimately, this enables the tenant to define the priority of their application, and this definition can be established considering costs. That is, tenants of a cloud platform typically pay more to the operator of the cloud platform for higher performance requirements outlined in an SLA compared to tenants with lower performance requirements outlined in an SLA.

Accordingly, an operator of the cloud platform can define various performance parameters, and a tenant can request or select different levels (e.g., amounts, values, etc.) for each performance parameter. Again, these performance parameters may be reflected in an SLA. Examples of performance parameters can include a number of virtual central processing units to be allocated for execution of an application, whether execution of the application requires central processing unit pinning, an amount of storage for execution of the application, an amount of input/output operations per second for execution of the application, whether execution of the application has an affinity or an anti-affinity requirement, a defined tolerance for oversubscription, and so forth. In some examples, performance parameters can make higher-level declarations, such as a type of application (e.g., health, financial, social media, content delivery, streaming, etc.) and/or whether the application requires state to be maintained (i.e., a state vs. stateless application). These higher-level declarations can further provide a basis for the classification and assignments implemented by the application registration entity. Other performance parameters that can be satisfied via the allocation of hardware resources are also contemplated in the context of this disclosure. As described above, an application is configured to generate a signature using one or more performance parameters.

An operator of the cloud platform may expose an application programming interface (API) so that tenants can access the application registration entity. In this way, the tenants are provided with guidance with respect to defining the performance parameters that can be included in their signatures. Moreover, when the time comes to request execution of an application, a tenant can submit an execution request along with the signature via the API. The signature is received by the application registration entity and analyzed to identify at least one performance parameter. The application registration entity can then determine the level of performance required for the application and classify the application into one of a number of classifications. For example, the classification can be based on a determination that a first tier includes first hardware resources that have been previously configured to satisfy the performance parameter, while a second tier includes second hardware resources that have not been previously configured to satisfy the performance parameter. The application registration entity then assigns the execution of the application to the tier that corresponds to the classification.

As mentioned above, and in greater detail below, the disclosed techniques enhance the scalability of resources within a cloud platform which enables cloud service providers to realize increased efficiency in their resource allocation systems. Furthermore, the disclosed techniques improve the tenant experience. For example, a tenant now has the confidence that hardware resources allocated within a cloud platform can effectively meet the performance needs of a more demanding application. This is because the cloud platform is provided, in an efficient manner, with sufficient insight into what exactly the more demanding application needs to execute flawlessly. Furthermore, while a tenant may previously know which datacenter is called upon to execute an application (e.g., execution may be limited to a geographic region due to governmental constraints, time of day, etc.), the tenant now can be informed of identifiable racks and/or servers within a datacenter on which their application is executing.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein provide systems for optimizing the use of cloud infrastructure and for assigning the execution of an application to hardware resources in a cloud platform that are preconfigured to handle the execution of the application. An application registration entity is made aware of different tiers within the cloud infrastructure. A tier is a designated area within a datacenter, for example, where hardware resources are preconfigured to tailor to the execution of a particular classification of applications. The application registration entity can classify an application into one of various classifications based on performance parameters which are represented by an application signature. Once classified, the application registration entity assigns, or maps, the execution of the application to a tier in a datacenter that corresponds to the classification. This tier includes hardware resources preconfigured, or previously configured, to satisfy the performance parameter.

Various examples, scenarios, and aspects that enable the improved resource allocation and application assignment are described below with reference to FIGS. 1-6.

Figure 1:
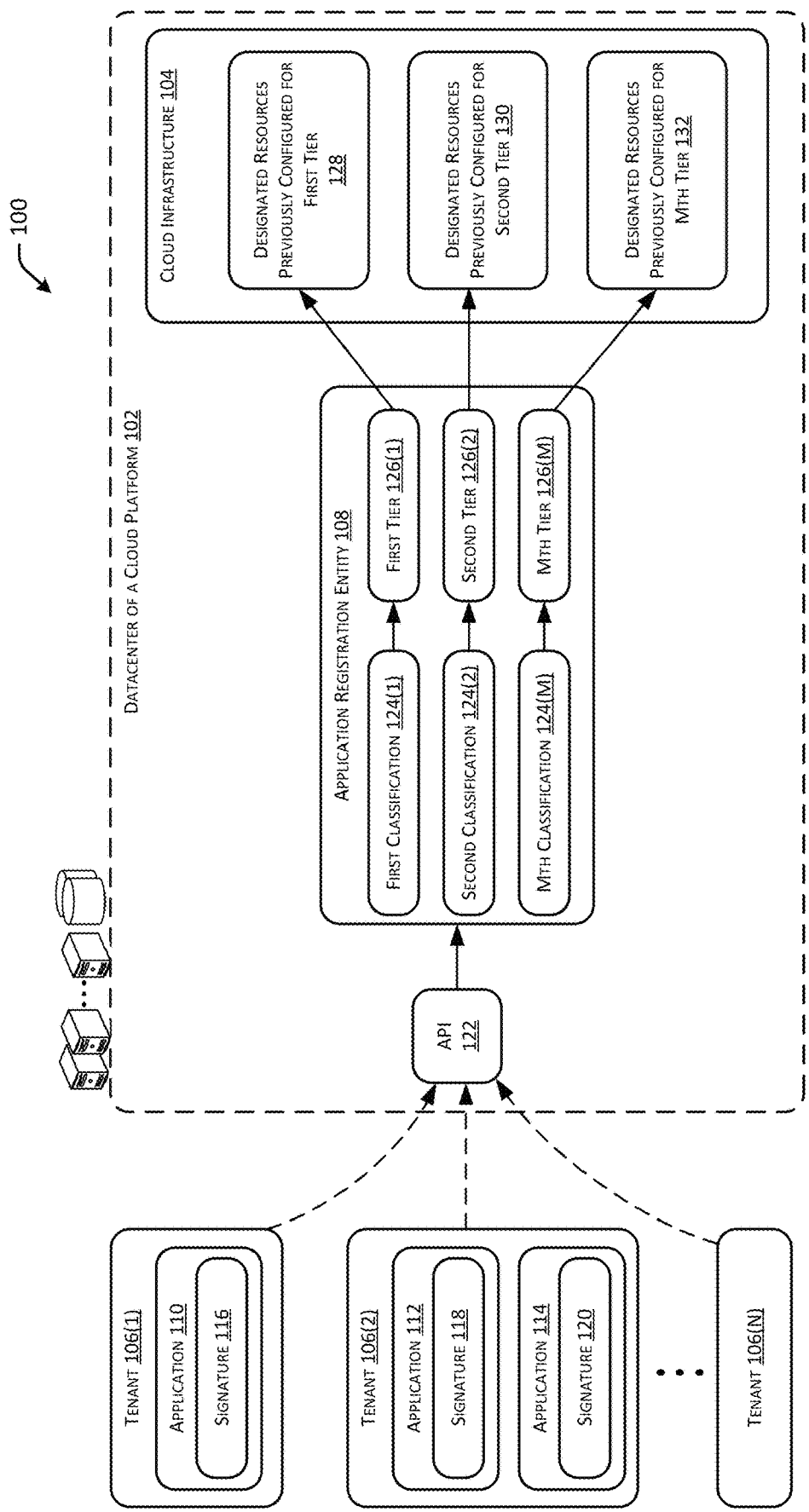
FIG. 1 illustrates an environment in which an application registration entity can receive a signature that represents at least one performance parameter for an application, classify the application based on the at least one performance parameter, and assign execution of the application to a tier (e.g., a designated area) in a datacenter where the hardware resources are preconfigured to satisfy the performance parameter.

FIG. 1 illustrates an environment 100 in which an application registration entity can receive a signature that represents at least one performance parameter for an application, classify the application based on the at least one performance parameter, and assign execution of the application to a tier (e.g., a designated area) in a datacenter where the hardware resources are preconfigured to satisfy the performance parameter. As shown, the environment 100 includes a datacenter 102 that hosts cloud infrastructure 104. The cloud infrastructure 104 includes physical components (e.g., racks of servers, networking equipment, etc.) that are allocated to execute applications for tenants 106(1-N) of the cloud platform (wherein N can include hundreds, thousands, or even millions of tenants).

The datacenter 102 also includes an application registration entity 108. As further discussed herein, the application registration entity 108 provides the optimizations and improvements with respect to allocation of resources within the cloud infrastructure 104 for execution of applications for tenants 106(1-N). As shown in FIG. 1, tenant 106(1) is a customer or client to an operator of a cloud platform such that tenant 106(1) can execute application 110 via the cloud infrastructure 104. Similarly, tenant 106(2) is a customer or client to an operator of a cloud platform such that tenant 106(2) can execute applications 112, 114 via the cloud infrastructure 104. Depending on a size of the tenant and the services provided by the tenant, a tenant may be configured to execute any number of applications, e.g., one for each of multiple different features of a service provided.

An application described herein can be configured to generate a signature that represents at least one performance parameter associated with execution of the application within the cloud infrastructure 104. Examples of performance parameters are further described herein with respect to FIG. 2. Accordingly, application 110 can generate a signature 116. Similarly, application 112 can generate signature 118 and application 114 can generate signature 120. The application registration entity 108 is configured to expose an application programming interface (API) 122 to tenants 106(1-N) to enable reception of the signatures 116, 118, 120. That is, when it comes time to execute the applications 110, 112, 114, tenants 106(1) and 106(2) send a request to execute the applications 110, 112, 114 along with the signatures 116, 118, 120 to the application registration entity 108 through the API 122.

The application registration entity 108 is configured to classify each of the applications 110, 112, 114 into one of various classifications 124(1-M) based on the performance parameters represented by the signatures 116, 118, 120. The number of classifications M can be intelligently established by an operator of the cloud platform to maximize quality of service to a large number of tenants 106(1-N) that execute an ever increasing number of different applications that require various levels of performance from the cloud infrastructure 104. This enables an operator of the cloud platform to effectively manage resource allocation and reduce costs based on predicted tenant demand for execution of different types of applications that demand different performance requirements.

Once classified, the application registration entity 108 assigns, or maps, the execution of applications 110, 112, 114 to tiers 126(1-M) in the datacenter 102 that directly correspond to the classifications 124(1-M). As shown, the tiers 126(1-M) include hardware resources in the cloud infrastructure 104 that are preconfigured, or previously configured, to satisfy the performance parameters represented by the signatures 116, 118, 120. That is, the first tier 126(1) includes a first set of designated resources 128 in the cloud infrastructure 104, the second tier 126(2) includes a second set of designated resources 130 in the cloud infrastructure 104, and the mth tier 126(M) includes an mth set of designated resources 132 in the cloud infrastructure 104. The resources are configured differently such that different classifications of applications are executed differently. In one example, the cloud infrastructure 104 is divided into the tiers such that the designated resources 128, 130, 132 are in separate areas of the datacenter 102, which thereby creates boundaries between the designated resources 128, 130, 132.

Figure 2:
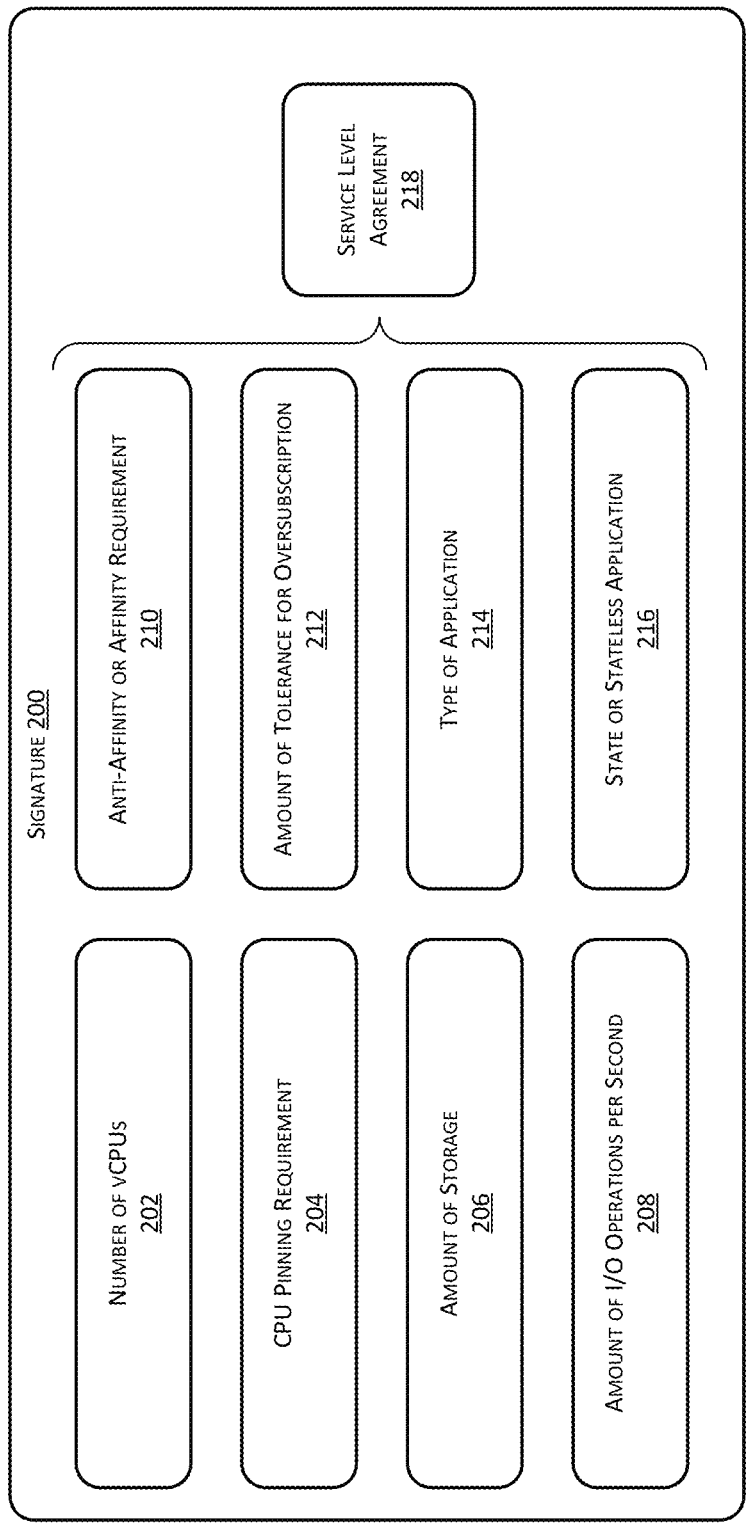
FIG. 2 is a diagram illustrating example performance parameters that can be represented by a signature.

FIG. 2 is a diagram illustrating example performance parameters that can be represented by a signature 200. In one example, an operator of the cloud platform can define the performance parameters, and a tenant can request or select different levels (e.g., amounts, values, etc.) for each performance parameter. This may be implemented via the API 122 exposed by the application registration entity 108. Furthermore, the application registration entity 108 can associate different levels of performance parameters to the classifications 124(1-M) and tiers 126(1-M). In this way, the application registration entity 108 can map a performance parameter to a specific classification.

A first example performance parameter 202 can include a number (e.g., a minimum number) of virtual central processing units (vCPUs) to be allocated for execution of an application. A vCPU represents a portion or share of the underlying, physical CPU that is assigned to a particular virtual machine (VM). Note that an application may be executed by one or multiple VMs.

A second example performance parameter 204 can include whether the application has a central processing unit (CPU) pinning requirement. CPU pinning binds a process or a thread to a designated CPU or to a range of dedicated CPUs, so that the process or thread executes only on the designated CPU or the range of dedicated CPUs rather than any CPU.

A third example performance parameter 206 can include an amount of storage (e.g., a minimum amount of storage) for execution of the application (e.g., 2 gigabytes). More demanding applications likely require more storage compared to less demanding applications.

A fourth example performance parameter 208 can include an amount of input/output operations (e.g., measured per second) for execution of the application. Again, more demanding applications likely require more input/output operations per second compared to less demanding applications.

A fifth example performance parameter 210 can include an anti-affinity or an affinity requirement for execution of the application. An anti-affinity requirement increases resiliency by implementing a rule ensuring or requesting that two application elements (e.g., VMs) are not executed on the same underlying physical server. In contrast, an affinity requirement implements a rule ensuring or requesting that two application elements (e.g., VMs) are executed on the same underlying physical server.

A sixth example performance parameter 212 can include a defined amount of tolerance for oversubscription of cloud resources. As this tolerance increases, the chance of a fault or interruption in the execution of the application increases.

Other performance parameters that can be satisfied via the allocation of hardware resources in the cloud infrastructure 104 are also contemplated in the context of this disclosure. As described above, an application is configured to generate a signature that represents definitions (e.g., defined values, levels, settings, requirements) for one or more of these performance parameters. In one example, more stringent definitions of these performance parameter(s) indicate that state is to be maintained for execution of more demanding applications (e.g., if an error occurs a user of the application can be quickly returned to a state in an application session), while less stringent definitions of these performance parameter(s) indicate the tenant's tolerance for a stateless scenario where the recovery is slower and requires more steps for a user to return to the state in an application session at which point an error occurred.

In some embodiments, the performance parameters can make higher-level declarations, such as a type of application 214 (e.g., health, financial, social media, content delivery, streaming, etc.) and/or whether the application requires state to be maintained (i.e., a state or stateless application 216). These higher-level declarations can further provide a basis for the classification and assignments implemented by the application registration entity 108.

In some examples, the performance parameters for an application can be defined via elements of a service level agreement (SLA) 218 between a tenant and an operator of the cloud platform. That is, SLAs can outline performance expectations that can be mapped to the importance of the service provided by the application. Therefore, more stringently defined performance parameters allow for the more important applications to execute flawlessly in the cloud with little or no interruptions compared to the less important applications. Ultimately, an SLA 218 enables the tenant to define the priority of their application, and this definition can be established considering costs. That is, tenants of a cloud platform typically pay more to the operator of the cloud platform for higher performance requirements outlined in an SLA compared to tenants with lower performance requirements outlined in an SLA.

In one example, the different classifications 124(1-M) of applications in FIG. 1 may be defined based on different application priorities. For instance, a first group of applications may be high priority applications, a second group of applications may be medium priority applications, and a third group of applications may be low priority applications, as further described herein with respect to FIGS. 3A-3C. The priority of an application can be represented in any way (e.g., categories, levels, values, etc.) and may be established based on a type of service, a type of data being stored or provided, an amount of time it takes to complete a task, user experience expectations, a number of users of the application, or other application aspects. Accordingly, applications that perform a more important service using data that is generally known to be private or sensitive (e.g., a user's financial data, a user's health data, etc.) are likely to have a higher priority than applications that perform a less important service using data that is generally known to not be private or sensitive (e.g., content for consumption by the general population, weather data, map data, etc.). Again, the priority of an application can be established by a tenant via guidance provided by a cloud provider (e.g., an SLA can include agreed upon terms that map execution of the application to a set of performance parameters).

Figure 3A:
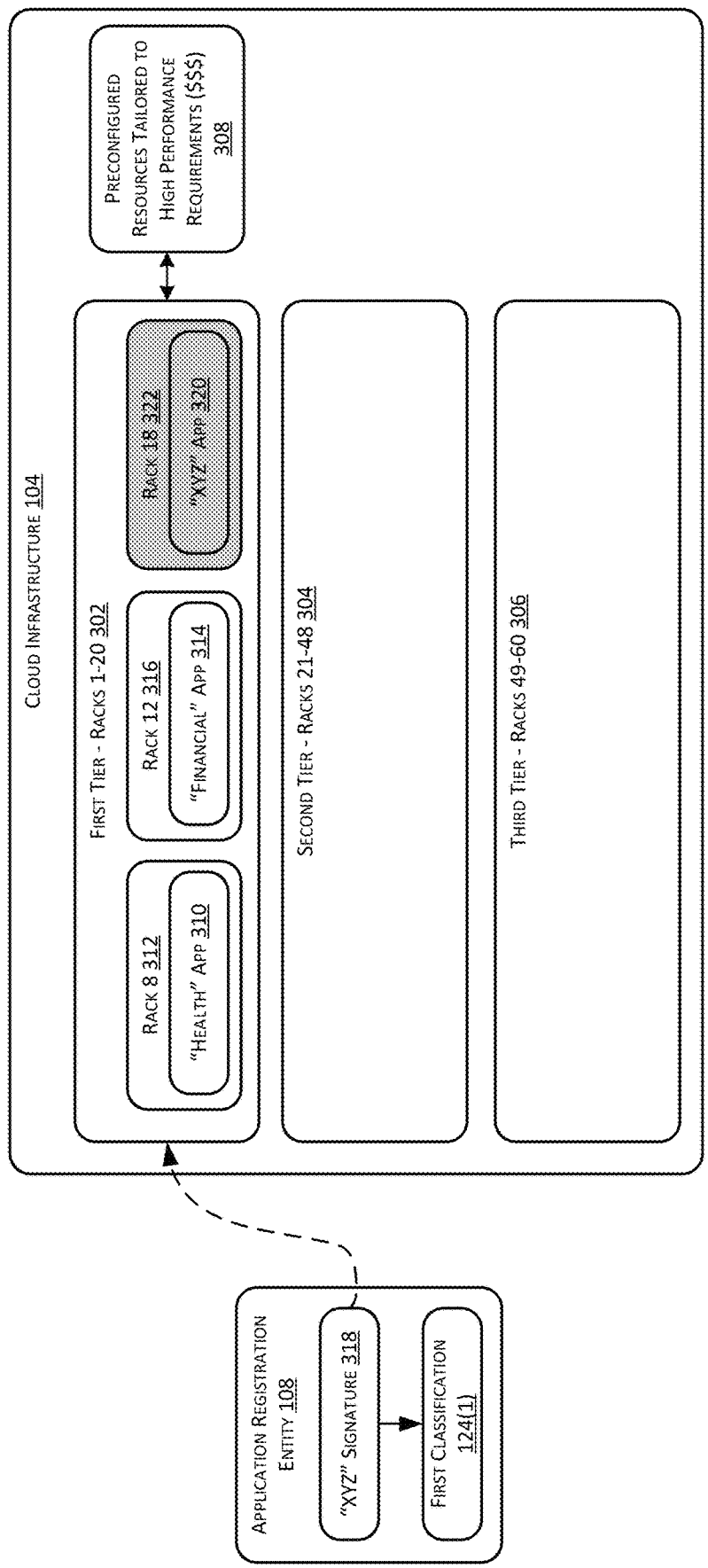
FIG. 3A is a diagram illustrating an example of how execution of an application can be mapped to an identifiable server rack and/or server based on the classification of the application as high priority.

FIG. 3A is a diagram illustrating how execution of an application can be mapped to an identifiable server rack and/or server based on the classification of the application as high priority. FIG. 3A illustrates the cloud infrastructure 104, as well as the application registration entity 108, from FIG. 1. As shown, the cloud infrastructure 104 includes 60 server racks divided into three tiers 126(1-M), where M=3 in this example, so that applications can be executed in different physical environments based on their classifications.

In the example of FIG. 3A (as well as FIGS. 3B and 3C), a first tier of the cloud infrastructure includes server racks 1-20 302. A second tier of the cloud infrastructure includes server racks 21-48 304. And the third tier of the cloud infrastructure includes server racks 49-60 306. The cloud provider is able to scale the configuration of hardware resources into the different tiers based on predicted tenant demand. For instance, a cloud provider can easily reconfigure, or move, server racks from one tier to another to better organize the cloud infrastructure to meet the anticipated needs of all its tenants. In one example, the needs can be anticipated, or predicted, based on the SLAs established. In another example, the needs can be anticipated, or predicted, based on historical usage data with regard to execution of applications. Ultimately, this enable more efficient organization and management with respect to resource allocation, which improves the tenant experience and saves costs for the cloud provider.

The server racks 1-20 302 in the first tier include hardware resources preconfigured to tailor to applications that have high performance requirements 308 (e.g., more stringent performance requirements). The three dollar signs ($$$) in element 308 represent the likelihood that a tenant pays more for an application to execute in the cloud in accordance with these high priority performance requirements. As shown, the first tier is already executing a high priority "health" app 310 on rack 8 312, and a high priority "financial" app 314 on rack 12 316.

When the time comes to request execution of an application, a tenant can submit an execution request along with the signature via the API 122. As shown in FIG. 3A, the application registration entity 108 receives a request to execute application "XYZ" along with a "XYZ" signature 318 that represents performance parameters the tenant expects, or demands, with regard to execution of the application "XYZ". The application registration entity 108 analyzes the "XYZ" signature 318 to identify at least one performance parameter. The application registration entity 108 can then determine the level of performance required for the application "XYZ" and classify the application "XYZ" into the high priority classification 124(1) based on the identified performance parameter. For example, the application registration entity 108 can map a value for the performance parameter to a predetermined range of values associated with the high priority classification 124(1). Based on this classification, the application registration entity 108 assigns the execution of application "XYZ" 320 to an identifiable rack (e.g., rack 18 322) in the first tier of racks 1-20 302 (as represented by the shading in FIG. 3A) and/or an identifiable server (e.g., server no. 8 in rack 18).

Consequently, via implementation of the application registration entity 108, the operator of the cloud platform knows exactly where application "XYZ" 320 is executing and that this location is in a designated area that has preconfigured resources that can satisfy any of the performance parameters for application "XYZ" 320, as represented in the "XYZ" signature 318. In some examples, the application registration entity 108 can inform the tenant of the identifiable rack (e.g., rack 18 322) and/or an identifiable server on which application "XYZ" is executing.

In another example, the classification can be based on a determination that the first tier of racks 1-20 302 includes hardware resources that have been previously configured to satisfy the performance parameters for the "XYZ" application 320, while the second tier of racks 21-48 304 and the third tier of racks 49-60 306 include hardware resources that have not been previously configured to satisfy the performance parameters for the "XYZ" application 320. If multiple tiers of racks can satisfy the performance parameters, the classification can be based on the cheapest option or classification, as that is what the tenant has likely paid for.

In some examples, specific racks and/or servers in the first tier 302 can be reserved for applications labeled as critical or most important. Generally, this reservation comes with additional costs for tenants. However, a cloud provider can guarantee that specifics racks (e.g., racks 1 and 2) and/or specific servers (e.g., rack 1 server 2) are reserved for execution of a limited number of critical or most important applications. Consequently, tenants know that execution of these types of applications on the resources configured for high performance will always be available to them.

Figure 3B:
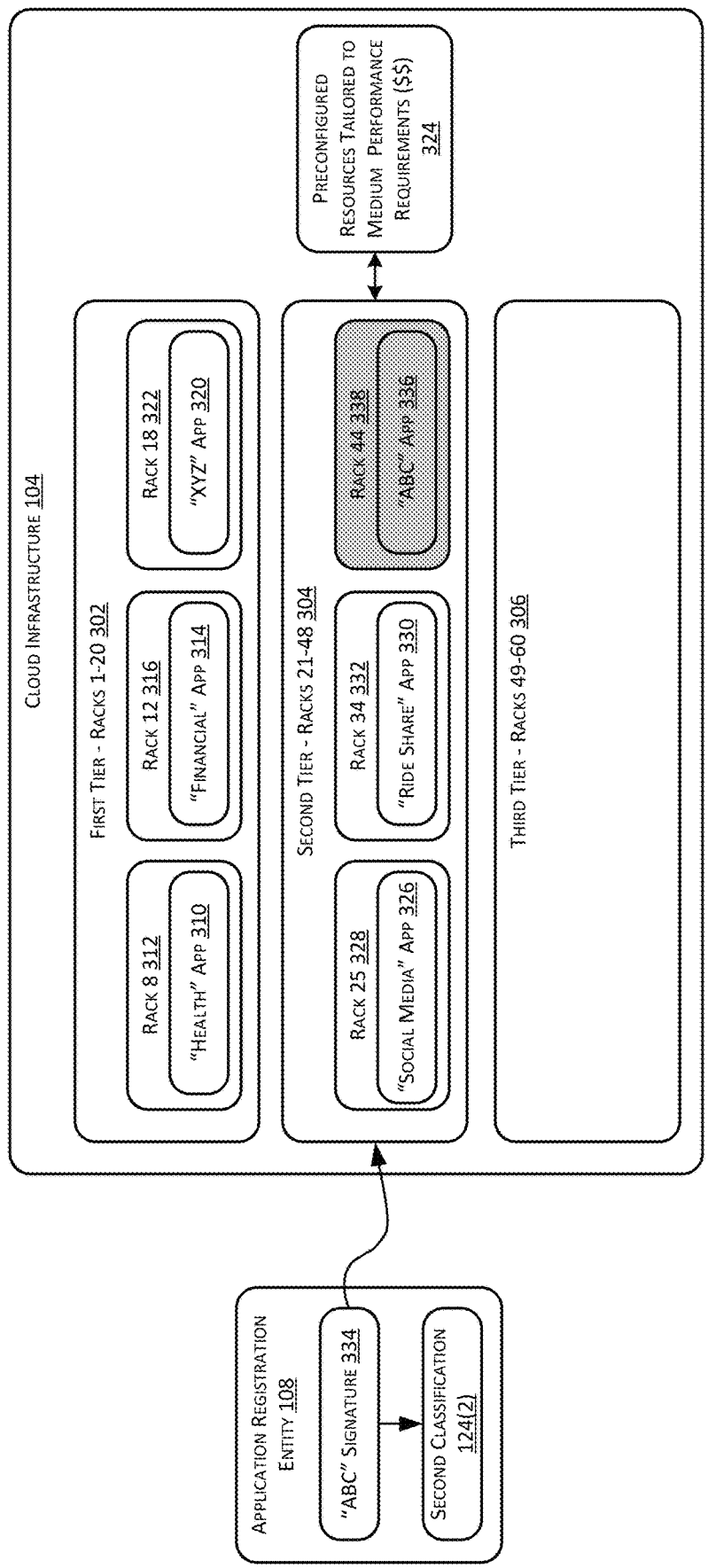
FIG. 3B is a diagram illustrating an example of how execution of an application can be mapped to an identifiable server rack and/or server based on the classification of the application as medium priority.

FIG. 3B is a diagram illustrating how execution of an application can be mapped to an identifiable server rack and/or server based on the classification of the application as medium priority. Similar to FIG. 3A, FIG. 3B shows that server racks 21-48 304 in the second tier include hardware resources preconfigured to tailor to applications that have medium performance requirements 324. The two dollar signs ($$) in element 324 represent the likelihood that a tenant likely pays an amount that is less than the amount paid for an application to execute in the cloud in accordance with the high priority performance requirements. As shown, the second tier is already executing a medium priority "social media" app 326 on rack 25 328, and a medium priority "ride share" app 330 on rack 34 332.

FIG. 3B further shows that the application registration entity 108 receives a request to execute application "ABC" along with a "ABC" signature 334 that represents performance parameters the tenant expects, or demands, with regard to execution of the application "ABC". The application registration entity 108 analyzes the "ABC" signature 334 to identify at least one performance parameter. The application registration entity 108 can then determine the level of performance required for the application "ABC" and classify the application "ABC" into the medium priority classification 124(2) based on the identified performance parameter. For example, the application registration entity 108 can map a value for the performance parameter to a predetermined range of values associated with the medium priority classification 124(2). Based on this classification, the application registration entity 108 assigns the execution of application "ABC" 336 to an identifiable rack (e.g., rack 44 338) in the second tier of racks 21-48 304 (as represented by the shading in FIG. 3B) and/or an identifiable server (e.g., server no. 7 in rack 44).

Figure 3C:
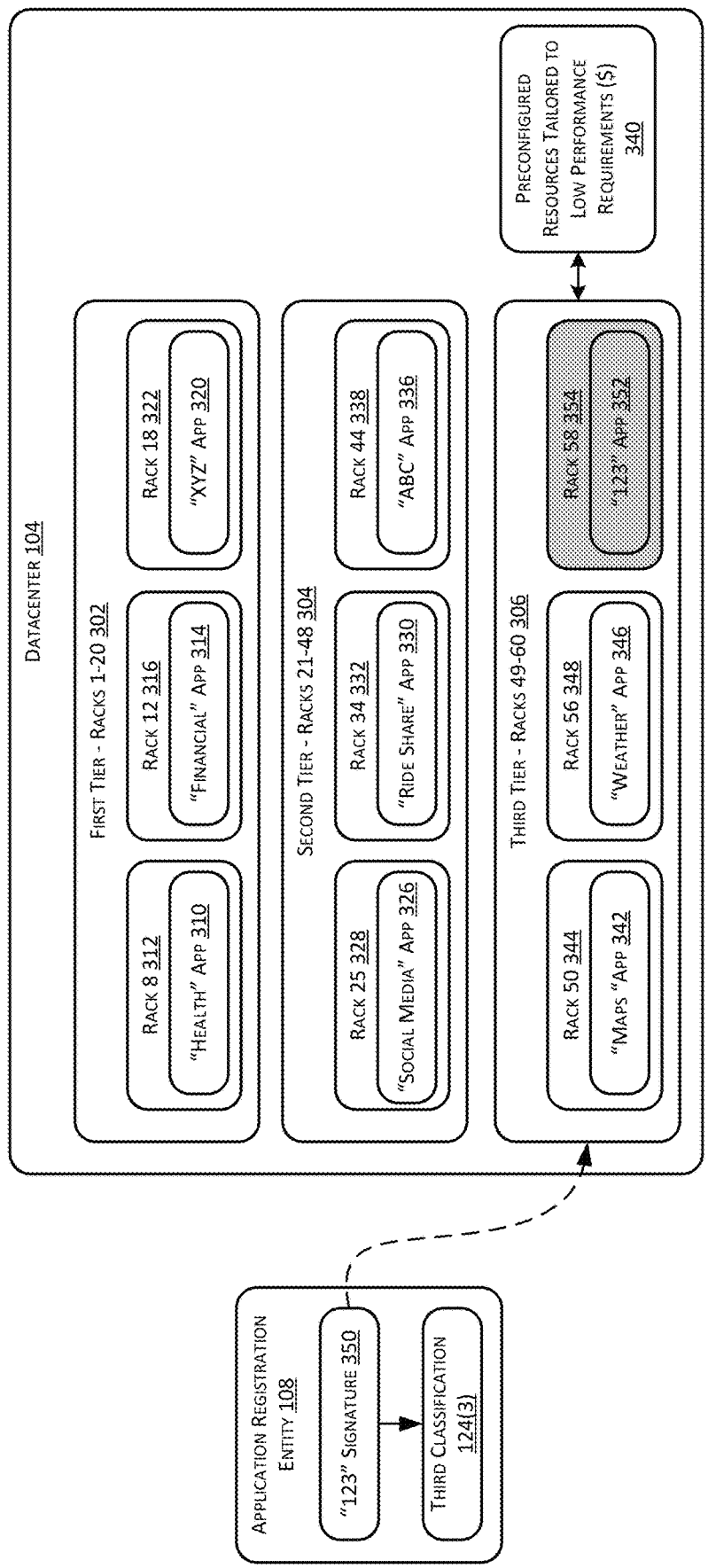
FIG. 3C is a diagram illustrating an example of how execution of an application can be mapped to an identifiable server rack and/or server based on the classification of the application as low priority.

FIG. 3C is a diagram illustrating how execution of an application can be mapped to an identifiable server rack and/or server based on the classification of the application as low priority. Similar to FIG. 3A and FIG. 3B, FIG. 3C shows that server racks 49-60 306 in the third tier include hardware resources preconfigured to tailor to applications that have low performance requirements 340. The single dollar sign ($) in element 340 represent the likelihood that a tenant likely pays an amount that is less than the amount paid for an application to execute in the cloud in accordance with the high or medium priority performance requirements. As shown, the third tier is already executing a low priority "maps" app 342 on rack 50 344, and a low priority "weather" app 346 on rack 56 348.

FIG. 3C further shows that the application registration entity 108 receives a request to execute application "123" along with a "123" signature 350 that represents performance parameters the tenant expects, or demands, with regard to execution of the application "123". The application registration entity 108 analyzes the "123" signature 350 to identify at least one performance parameter. The application registration entity 108 can then determine the level of performance required for the application "123" and classify the application "123" into the low priority classification 124(3) based on the identified performance parameter. For example, the application registration entity 108 can map a value for the performance parameter to a predetermined range of values associated with the low priority classification 124(3). Based on this classification, the application registration entity 108 assigns the execution of application "123" 352 to an identifiable rack (e.g., rack 58 354) in the third tier of racks 49-60 306 (as represented by the shading in FIG. 3C) and/or an identifiable server (e.g., server no. 6 in rack 58).

As illustrated in FIGS. 3A-3C, the techniques disclosed herein effectively create boundaries between the separate designated areas configured in a customized manner for the different application classifications. This allows a cloud provider to ensure better performance and a higher quality of service for more important applications (e.g., more power feeds, cleaning, and redundancy can be provided to the server racks that host the more important applications). More specifically, the application registration entity 108 can associate different levels of performance parameters to the classifications 124(1-M). For example, if the performance parameter indicates anywhere from one to seven vCPUs are required or preferred for execution of the application, the application registration entity 108 can classify the application in the low priority classification 124(3). If the performance parameter indicates anywhere from eight to fifteen vCPUs are required or preferred for execution of the application, the application registration entity 108 can classify the application in the medium priority classification 124(2). If the performance parameter indicates sixteen or more vCPUs are required or preferred for execution of the application, the application registration entity 108 can classify the application in the high priority classification 124(1). In this way, the application registration entity 108 can map a performance parameter to a specific classification.

Furthermore, via the implementation of the application registration entity 108, a cloud provider is aware of which applications are executing on which racks and/or servers. This awareness enables a cloud provider to take actions more effectively and efficiently in the event of a failure or other type of error. For instance, the cloud provider can reach out and contact tenants in the event of a failure so a service interruption can be more appropriately addressed by both the cloud provider and the tenant.

Figure 4:
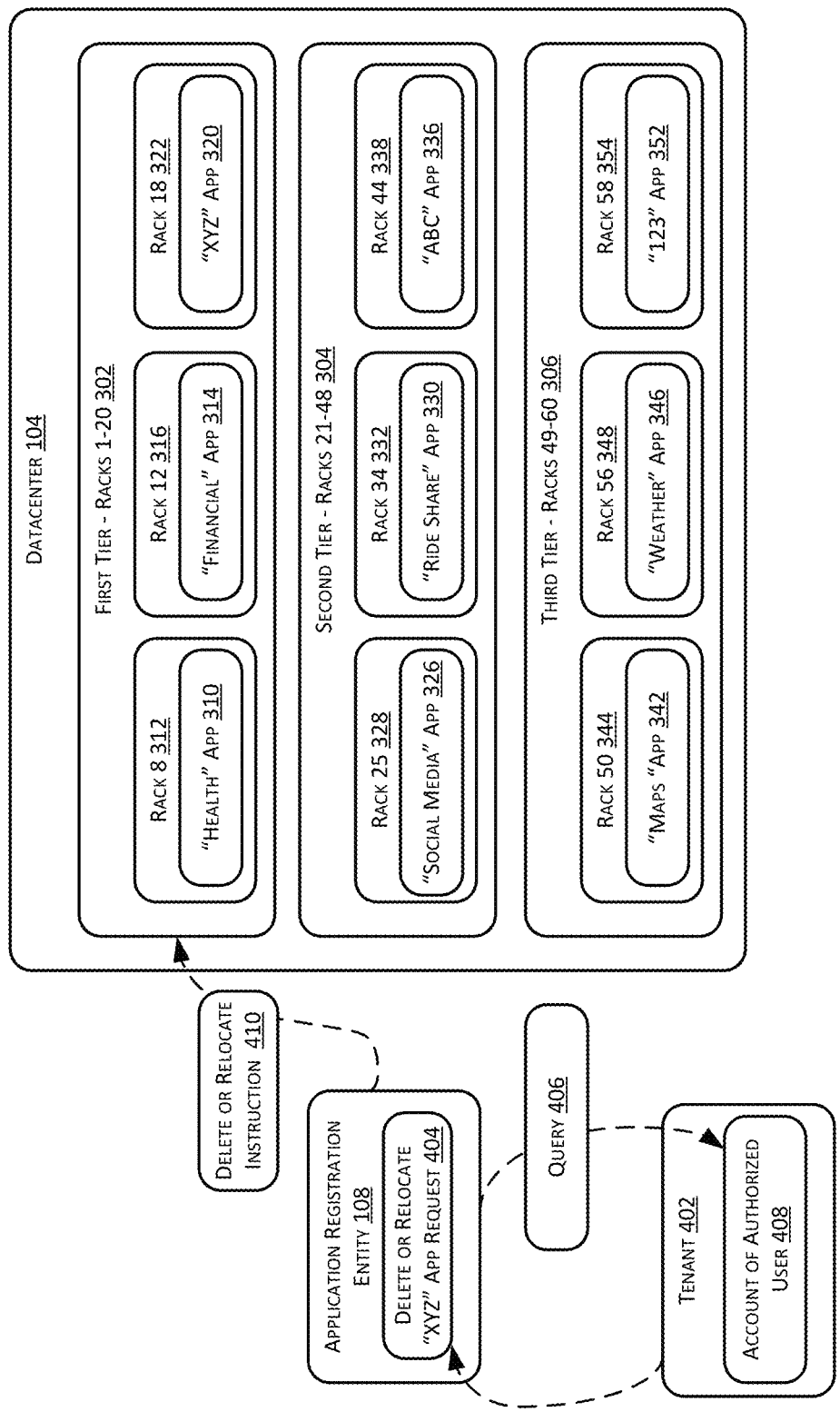
FIG. 4 illustrates a diagram that shows an example of how a check can be made before deleting or relocating a high priority application.

FIG. 4 illustrates a diagram that shows how a check can be made before deleting or relocating a high priority application. Tenants may request to delete or relocate applications for various reasons (e.g., shutting down an old version of the application after an upgrade to a new version, moving to less expensive cloud resources, etc.). As shown in FIG. 4, a tenant 402 requests to delete or relocate the "XYZ" application 404. However, because the "XYZ" application 320 is a high priority application executing in the first tier 302, a verification process may be implemented to ensure that the deletion or relocation of the application is approved by an authorized user associated with the tenant 402 (e.g., a Senior Vice President in the company). This verification process may not need to be implemented for the medium and low priority applications.

Accordingly, the application registration entity 108 is configured to send a query 406 (e.g., an electronic mail message) to an account associated with the authorized user 408, where the query requests further approval to delete or relocate the application (in addition to the original deletion or relocation request). The query 406 may indicate and warn that deletion should not occur because the application is a high priority, or that relocation should not occur due to the current time of day when the application is being heavily used. If further approval is received regardless of the warnings issued in the query 406, the application registration entity 108 can send a delete or relocate instruction 410 for the "XYZ" application 320.

Figure 5:
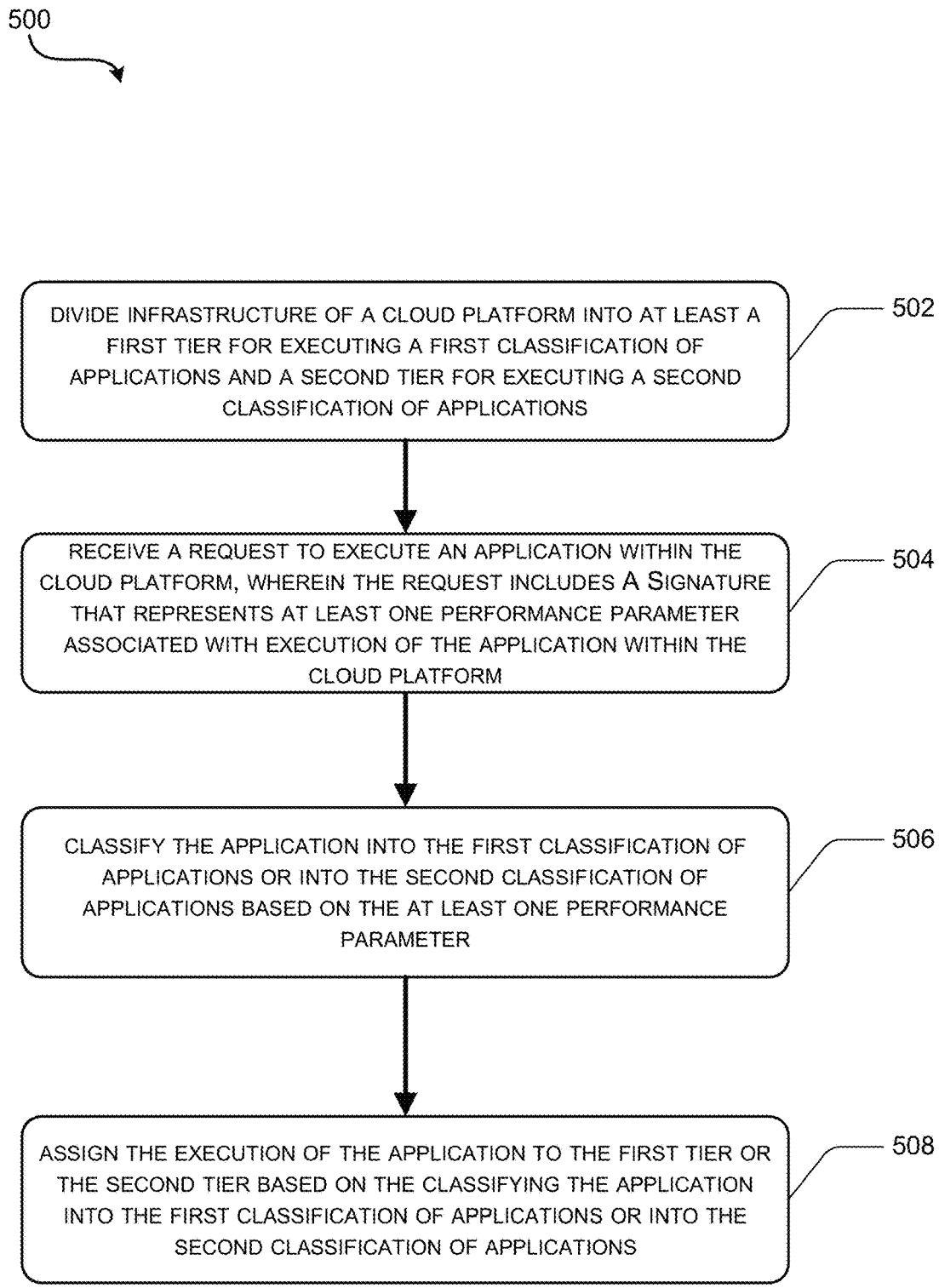
FIG. 5 is a flow diagram of an example routine for assigning execution of an application to a tier (e.g., a designated area) in a datacenter where the hardware resources are preconfigured to satisfy a performance parameter represented by a signature generated for the application.

Turning now to FIG. 5, aspects of a routine for assigning execution of an application to a tier (e.g., a designated area) in a datacenter where the hardware resources are preconfigured to satisfy a performance parameter represented by a signature generated for the application. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

With reference to FIG. 5, routine 500 begins at operation 502 where infrastructure of a cloud platform is divided into at least a first tier for executing a first classification of applications and a second tier for executing a second classification of applications. As described above, the first tier includes first hardware resources and the second tier includes second hardware resources. The first hardware resources are configured in a different manner compared to the second hardware resources. For instance, the first hardware resources are configured to handle more stringent performance demands for high priority applications, while the second hardware resources are configured to handle less stringent performance demands for low priority applications.

At operation 504, a request to execute an application within the cloud platform is received from a tenant. The request includes at least one performance parameter associated with execution of the application within the cloud platform. In one example, the at least one performance parameter can be represented by a signature which the application generates.

At operation 506, the application is classified into one of the first classification of applications or into second classification of applications based on the at least one performance parameter. For example, the classifying can be based on a mapping between a value for the performance parameter and a range of values associated with one of the first or second classifications. In another example, the classifying can be based on a determination that the first hardware resources are able to satisfy the at least one performance parameter and that the second hardware resources are unable to satisfy the at least one performance parameter.

At operation 508, the execution of the application to the first tier or the second tier based on the classifying the application into the first classification of applications or into second classification of applications.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

Figure 6:
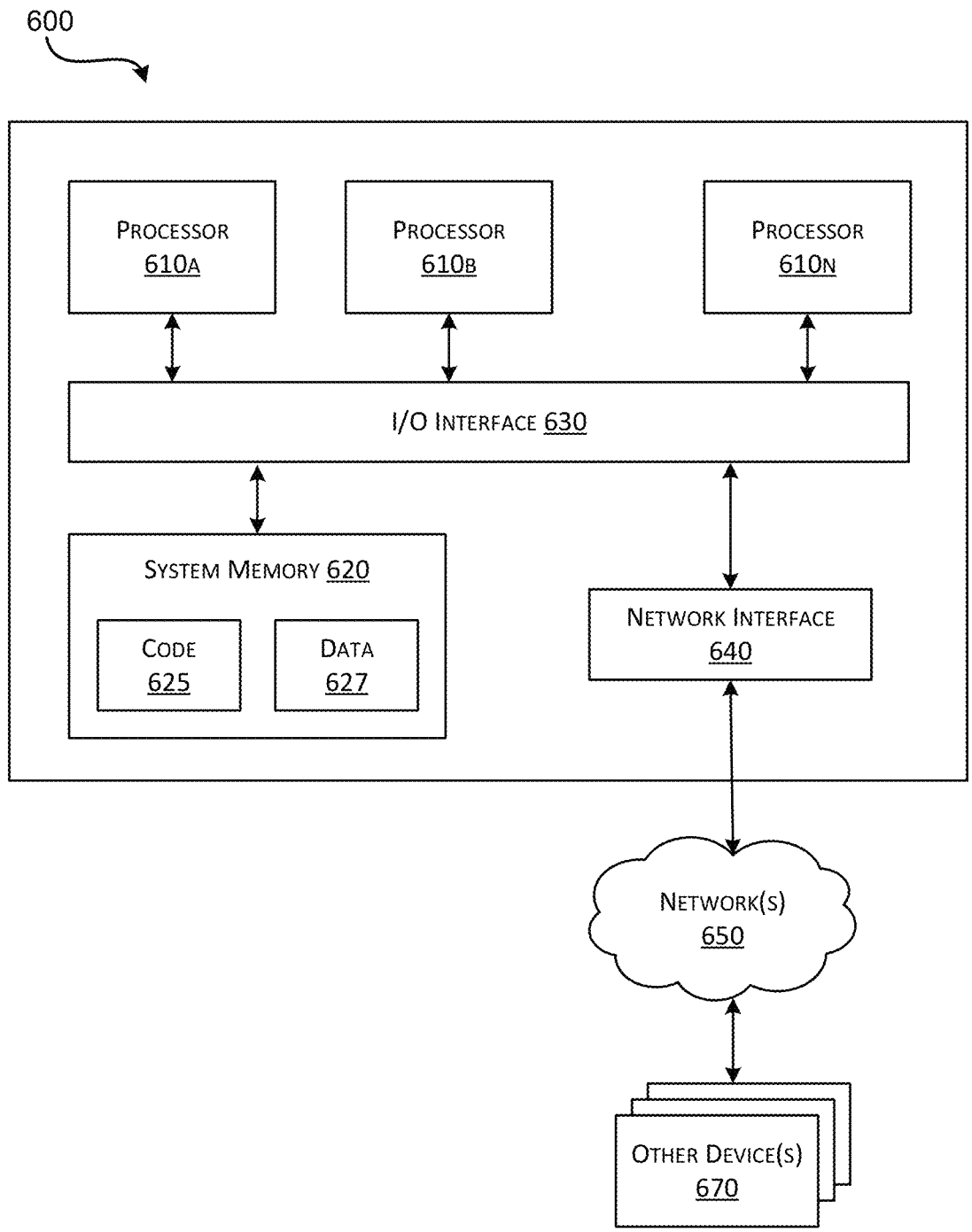
FIG. 6 is an example computing system capable of implementing the techniques of the present disclosure.

FIG. 6 illustrates a general-purpose computing device 600. In various examples, device 600 can be a server computer or any other sort of computing device that can serve as a physical host or other sort of computing device in the cloud platform. In the illustrated embodiment, computing device 600 includes one or more processors 610a, 610b, and/or 610n (which may be referred herein singularly as "a processor 610" or in the plural as "the processors 610") coupled to a system memory 620 via an input/output (I/O) interface 630. Computing device 600 further includes a network interface 640 coupled to the I/O interface 630. In various embodiments, the processors 610 can be the processing cores described above.

In various embodiments, computing device 600 may be a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x77, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those routines, techniques and data described above, are shown stored within system memory 620 as code 625 and data 627.

In one embodiment, the I/O interface 630 may be configured to coordinate I/O traffic between the processor 610, system memory 620, and any peripheral devices in the device, including network interface 640 or other peripheral interfaces. In some embodiments, the I/O interface 630 may perform any necessary protocol, timing, or other data transformations to convert data signals from one component (e.g., system memory 620) into a format suitable for use by another component (e.g., processor 610). In some embodiments, the I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of the I/O interface 630, such as an interface to system memory 620, may be incorporated directly into processor 610.

Network interface 640 may be configured to allow data to be exchanged between computing device 600 and other device or devices 670 attached to a network or network(s) 650, such as other computer systems or components illustrated in FIGS. 1 through 4, for example. In various embodiments, network interface 640 may support communication via any suitable wired or wireless general data networks. Additionally, network interface 640 may support communication via telecommunications/telephony networks such as analog voice networks or digital fiber communications networks, via storage area networks such as Fibre Channel SANs or via any other suitable type of network and/or protocol.

Network(s) 650 may include, for example, public networks such as the Internet, private networks such as an institutional and/or personal intranet, or some combination of private and public networks. Network(s) 650 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. Network(s) 650 may utilize communications protocols, including packet-based and/or datagram-based protocols such as Internet protocol ("IP"), transmission control protocol ("TCP"), user datagram protocol ("UDP"), or other types of protocols. Moreover, network(s) 650 may also include a number of devices that facilitate network communications and/or form a hardware basis for the networks, such as switches, routers, gateways, access points, firewalls, base stations, repeaters, backbone devices, and the like.

In some embodiments, system memory 620 may be one embodiment of a computer-accessible medium configured to store program instructions and data as described above for FIGS. 1-5. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640.

Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "system" and/or "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 6, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses.

Example Clause A, a method comprising: configuring infrastructure of a cloud platform into at least a first tier for executing a first classification of applications and a second tier for executing a second classification of applications; receiving, at an application registration entity configured within the cloud platform, a signature for an application to be executed within the cloud platform, wherein the signature represents at least one performance parameter associated with execution of the application within the cloud platform; analyzing, by the application registration entity, the signature to identify the at least one performance parameter; classifying, by the application registration entity and based on the analyzing, the application in the first classification of applications based on a determination that the first tier includes first hardware resources that are able to satisfy the at least one performance parameter and that the second tier includes second hardware resources that are unable to satisfy the at least one performance parameter; and assigning, by the application registration entity and based on the classifying, the execution of the application to the first tier.

Example Clause B, the method of Example Clause A, wherein the at least one performance parameter specifies: a number of virtual central processing units; a central processing unit pinning requirement; an amount of storage; an amount of input/output operations per second; an affinity or an anti-affinity requirement; a tolerance for oversubscription; a type of application; or a state requirement.

Example Clause C, the method of Example Clause A or Example Clause B, wherein a request to execute the application is received from a tenant of the cloud platform.

Example Clause D, the method of Example Clause C, wherein the application registration entity is exposed to the tenant via an application programming interface (API) of the cloud platform.

Example Clause E, the method of any one of Example Clauses A through D, wherein the signature is generated by the application in association with a service level agreement (SLA) between the tenant and an operator of the cloud platform.

Example Clause F, the method of any one of Example Clauses A through E, wherein the first hardware resources included in the first tier comprise a first set of identifiable server racks and the second hardware resources included in the second tier comprise a second set of identifiable server racks, wherein the first set of identifiable server racks are configured to offer better performance when compared to the second set of identifiable server racks.

Example Clause G, a system comprising: one or more processors; and computer storage media storing instructions that, when executed by the one or more processors, cause the system to perform operations comprising: dividing infrastructure of a cloud platform into at least a first tier for executing a first classification of applications and a second tier for executing a second classification of applications, wherein: the first tier includes first hardware resources; the second tier includes second hardware resources; and the first hardware resources are configured in a different manner compared to the second hardware resources; receiving a request to execute an application within the cloud platform, wherein the request includes a signature that represents at least one performance parameter associated with execution of the application within the cloud platform; classifying the application into the first classification of applications based on the at least one performance parameter; and assigning the execution of the application to the first tier based on the classifying the application into the first classification of applications.

Example Clause H, the system of Example Clause G, wherein the at least one performance parameter specifies: a number of virtual central processing units; a central processing unit pinning requirement; an amount of storage; an amount of input/output operations per second; an affinity or an anti-affinity requirement; a tolerance for oversubscription; a type of application; or a state requirement.

Example Clause I, the system of Example Clause G or Example Clause H, wherein the request to execute the application is received from a tenant of the cloud platform.

Example Clause J, the system of Example Clause I, wherein the cloud platform exposes an application programming interface (API) to enable the tenant to submit the request to execute the application.

Example Clause K, the system of Example Clause I or Example Clause J, wherein the signature is generated by the application in association with a service level agreement (SLA) between the tenant and an operator of the cloud platform.

Example Clause L, the system of any one of Example Clauses G through K, wherein the first hardware resources included in the first tier comprise a first set of identifiable server racks and the second hardware resources included in the second tier comprise a second set of identifiable server racks, wherein the first set of identifiable server racks are configured to offer better performance when compared to the second set of identifiable server racks.

Example Clause M, the system of any one of Example Clauses G through L, wherein the at least one performance parameter comprises a value, and the classifying comprises mapping the value to a range of values associated with the first classification.

Example Clause N, the system of any one of Example Clauses G through M, wherein the operations further comprise: receiving a request to delete or relocate the application; determining, based on the classifying the application into the first classification of applications, that approval to delete or relocate the application is needed from an authorized user; sending a query to an account associated with the authorized user to approve deletion or relocation of the application; and deleting or relocating the application in response to receiving the approval to delete or relocate the application from an authorized user.

Example Clause O, a method comprising: dividing infrastructure of a cloud platform into at least a first tier for executing a first classification of applications and a second tier for executing a second classification of applications, wherein: the first tier includes first hardware resources; the second tier includes second hardware resources; and the first hardware resources are configured in a different manner compared to the second hardware resources; receiving a request to execute an application within the cloud platform, wherein the request includes a signature that represents at least one performance parameter associated with a service level agreement (SLA) related to execution of the application within the cloud platform; classifying, by one or more processors, the application into the first classification of applications based on the at least one performance parameter; and assigning the execution of the application to the first tier based on the classifying the application into the first classification of applications.

Example Clause P, the method of Example Clause O, wherein the at least one performance parameter specifies: a number of virtual central processing units; a central processing unit pinning requirement; an amount of storage; an amount of input/output operations per second; an affinity or an anti-affinity requirement; a tolerance for oversubscription; a type of application; or a state requirement.

Example Clause Q, the method of Example Clause O or Example Clause P, wherein the cloud platform exposes an application programming interface (API) of to enable a tenant to submit the request to execute the application.

Example Clause R, the method of any one of Example Clauses O through Q, wherein the first hardware resources included in the first tier comprise a first set of identifiable server racks and the second hardware resources included in the second tier comprise a second set of identifiable server racks, wherein the first set of identifiable server racks are configured to offer better performance when compared to the second set of identifiable server racks.

Example Clause S, the method of any one of Example Clauses O through R, wherein the at least one performance parameter comprises a value, and the classifying comprises mapping the value to a range of values associated with the first classification.

Example Clause T, the method of any one of Example Clauses O through R, further comprising determining that the first hardware resources included in the first tier are configured to satisfy the at least one performance parameter and that the second hardware resources included in the second tier are not configured to satisfy the at least one performance parameter, wherein the classifying is based on the determination.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different tiers, two different applications, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   configuring infrastructure of a cloud provider into at least a first tier for executing a first classification of applications and a second tier for executing a second classification of applications, wherein:
   the first tier is a first physical area within a datacenter of the cloud provider that includes a first set of identifiable server racks configured with first hardware resources tailored to execute the first classification of applications;
   the second tier is a second physical area within the datacenter of the cloud provider that includes a second set of identifiable server racks that is different than the first set of identifiable server racks, the second set of identifiable server racks configured with second hardware resources tailored to execute the second classification of applications; and
   the first physical area is separate from the second physical area thereby creating a datacenter boundary between the first set of identifiable server racks and the second set of identifiable server racks;
   receiving, at an application registration entity configured within the cloud provider, a signature for an application to be executed within the datacenter of the cloud provider, wherein the signature represents at least one performance parameter associated with execution of the application within the datacenter of the cloud provider;
   analyzing, by the application registration entity, the signature to identify the at least one performance parameter;
   classifying, by the application registration entity and based on the analyzing, the application in the first classification of applications based on a determination that the first hardware resources are able to satisfy the at least one performance parameter and that the second hardware resources are unable to satisfy the at least one performance parameter;

assigning, by the application registration entity and based on the classifying, the execution of the application to the first set of identifiable server racks included in the first physical area;

receiving a request to delete or relocate the application;

determining, based on the classifying the application into the first classification of applications, that approval to delete or relocate the application is needed from an authorized user;

sending a query to an account associated with the authorized user to approve deletion or relocation of the application; and deleting or relocating the application in response to receiving the approval to delete or relocate the application from the authorized user.

2. The method of claim 1, wherein the at least one performance parameter specifies:
a number of virtual central processing units;
a central processing unit pinning requirement;
an amount of storage;
an amount of input/output operations per second;
an affinity or an anti-affinity requirement;
a tolerance for oversubscription;
a type of application; or
a state requirement.

3. The method of claim 1, wherein a request to execute the application is received from a tenant of the cloud provider.

4. The method of claim 3, wherein the application registration entity is exposed to the tenant via an application programming interface (API) of the cloud provider.

5. The method of claim 1, wherein the signature is generated by the application in association with a service level agreement (SLA) between the tenant and the cloud provider.

6. The method of claim 1, wherein the first set of identifiable server racks is configured to offer better performance when compared to the second set of identifiable server racks.

7. A system comprising:
one or more processors; and
computer storage media storing instructions that, when executed by the one or more processors, cause the system to perform operations comprising:
dividing infrastructure of a cloud provider into at least a first tier for executing a first classification of applications and a second tier for executing a second classification of applications, wherein:
the first tier is a first physical area within a datacenter of the cloud provider that includes a first set of identifiable server racks configured with first hardware resources tailored to execute the first classification of applications;
the second tier is a second physical area within the datacenter of the cloud provider that includes a second set of identifiable server racks that is different than the first set of identifiable server racks, the second first set of identifiable server racks configured with second hardware resources tailored to execute the second classification of applications; and
the first physical area is separate from the second physical area thereby creating a datacenter boundary between the first set of identifiable server racks and the second set of identifiable server racks;
receiving a request to execute an application within the datacenter of the cloud provider, wherein the request includes a signature that represents at least one performance parameter associated with execution of the application within the datacenter of the cloud provider;
classifying the application into the first classification of applications based on the at least one performance parameter;
assigning the execution of the application to the first set of identifiable server racks included in the first physical area based on the classifying the application into the first classification of applications;
receiving a request to delete or relocate the application;
determining, based on the classifying the application into the first classification of applications, that approval to delete or relocate the application is needed from an authorized user;
sending a query to an account associated with the authorized user to approve deletion or relocation of the application; and
deleting or relocating the application in response to receiving the approval to delete or relocate the application from the authorized user.

8. The system of claim 7, wherein the at least one performance parameter specifies:
a number of virtual central processing units;
a central processing unit pinning requirement;
an amount of storage;
an amount of input/output operations per second;
an affinity or an anti-affinity requirement;
a tolerance for oversubscription;
a type of application; or
a state requirement.

9. The system of claim 7, wherein the request to execute the application is received from a tenant of the cloud provider.

10. The system of claim 9, wherein the signature is generated by the application in association with a service level agreement (SLA) between the tenant and the cloud provider.

11. The system of claim 7, wherein the first set of identifiable server racks is configured to offer better performance when compared to the second set of identifiable server racks.

12. The system of claim 7, wherein the at least one performance parameter comprises a value, and the classifying comprises mapping the value to a range of values associated with the first classification.

13. A method comprising:
dividing infrastructure of a cloud platform into at least a first tier for executing a first classification of applications and a second tier for executing a second classification of applications, wherein:
the first tier is a first area within a datacenter of the cloud platform that has first hardware resources tailored to execute the first classification of applications;
the second tier is a second area within the datacenter of the cloud platform that has second hardware resources that are different than the first hardware resources, the second hardware resources tailored to execute the second classification of applications;
the first area is separate from the second area thereby creating a datacenter boundary between the first hardware resources and the second hardware resources;
receiving a request to execute an application within the datacenter of the cloud platform, wherein the request includes a signature that represents at least one performance parameter associated with a service level agreement (SLA) related to execution of the application within the datacenter of the cloud platform;

classifying, by one or more processors, the application into the first classification of applications based on the at least one performance parameter;

assigning the execution of the application to the first tier based on the classifying the application into the first classification of applications;

receiving a request to delete or relocate the application;

determining, based on the classifying the application into the first classification of applications, that approval to delete or relocate the application is needed from an authorized user;

sending a query to an account associated with the authorized user to approve deletion or relocation of the application; and deleting or relocating the application in response to receiving the approval to delete or relocate the application from the authorized user.

14. The method of claim 13, wherein the at least one performance parameter specifies:
    a number of virtual central processing units;
    a central processing unit pinning requirement;
    an amount of storage;
    an amount of input/output operations per second;
    an affinity or an anti-affinity requirement;
    a tolerance for oversubscription;
    a type of application; or
    a state requirement.

15. The method of claim 13, wherein the first hardware resources comprise a first set of identifiable server racks and the second hardware resources comprise a second set of identifiable server racks, wherein the first set of identifiable server racks is configured to offer better performance when compared to the second set of identifiable server racks.

16. The method of claim 13, wherein the at least one performance parameter comprises a value, and the classifying comprises mapping the value to a range of values associated with the first classification.

17. The method of claim 13, further comprising determining that the first hardware resources are configured to satisfy the at least one performance parameter and that the second hardware resources are not configured to satisfy the at least one performance parameter, wherein the classifying is based on the determination.

* * * * *